Sept. 5, 1933.  R. M. HUNTER  1,925,096
GLASS MOLD
Filed Aug. 14, 1930
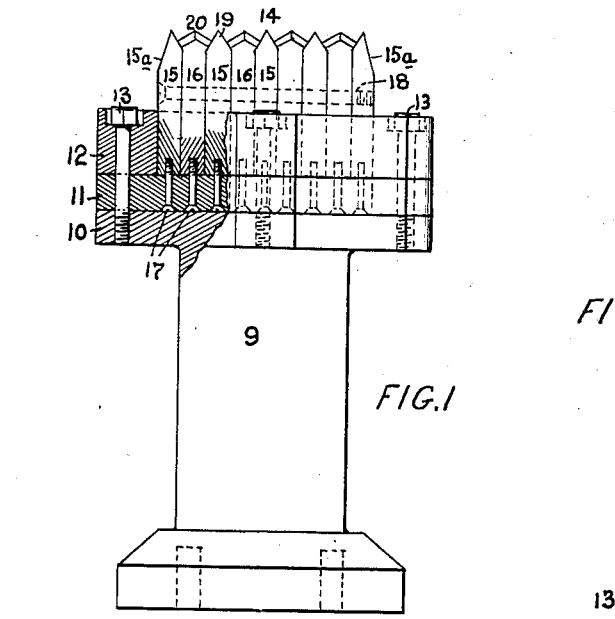
FIG.1
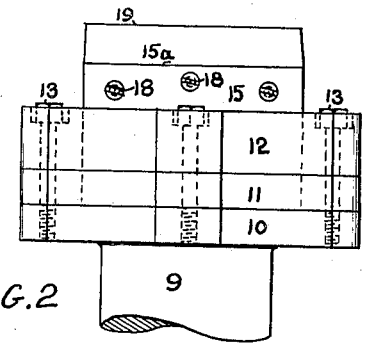
FIG.2
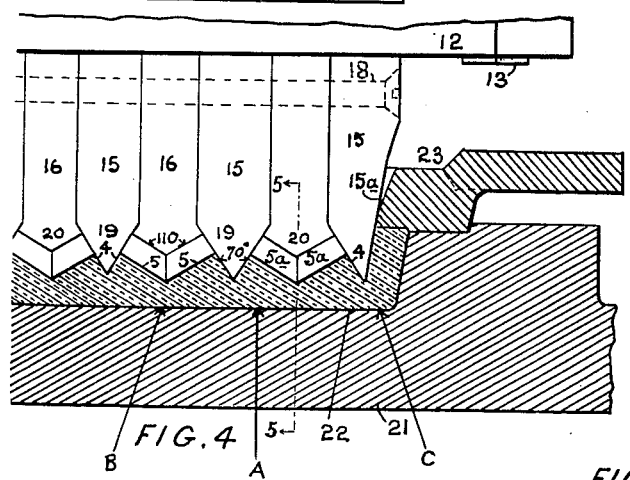
FIG.4
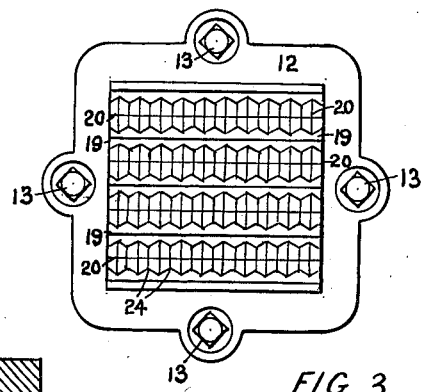
FIG.3
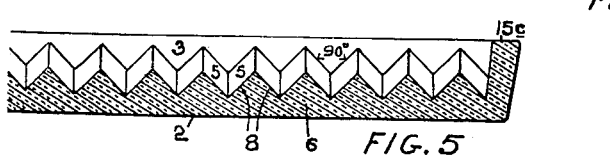
FIG.5
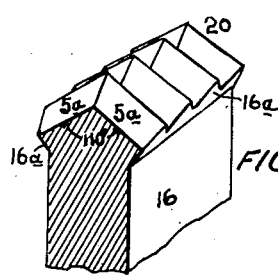
FIG.6
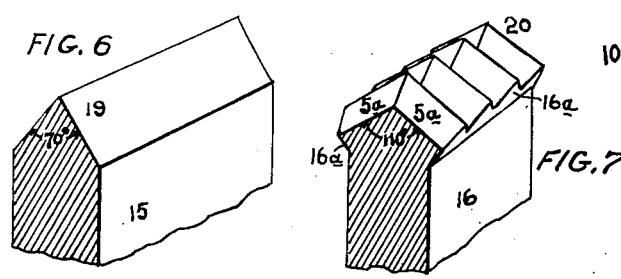
FIG.7
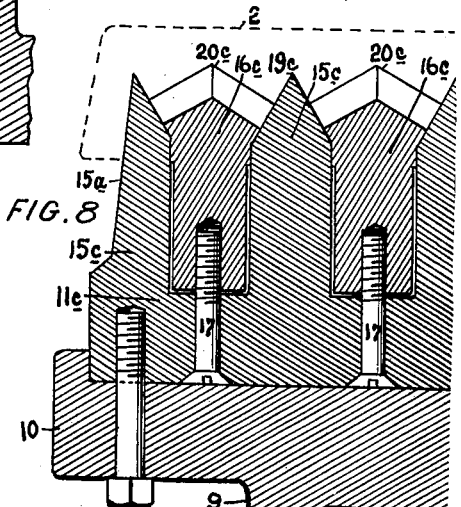
FIG.8
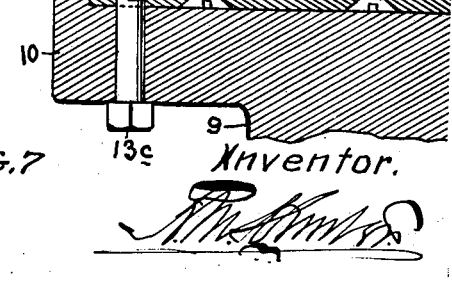
Inventor.

Patented Sept. 5, 1933

1,925,096

UNITED STATES PATENT OFFICE 1,925,096

GLASS MOLD

Rudolph M. Hunter, Philadelphia, Pa.

Application August 14, 1930. Serial No. 475,156

7 Claims. (Cl. 49—72)

In the manufacture of prism glass adapted for reflecting the light rays either for highway danger signal purposes, or for advertising purposes such as illuminated signs, in which the source of light may be from automobile headlights or fixedly-positioned spot-lights, great difficulty is experienced in providing molding means for pressing the glass so as to insure accuracy in the relative positioning of the reflecting surfaces and also in assuring capacity for renewing the finish of the pressing surfaces, whereby said reflecting surfaces may be maintained with an average operative polish of sufficient smoothness and brilliancy that the reflecting surfaces of the pressed glass is satisfactory and the mold primarily formed and its shaping parts easily renewed or surfaced so as to provide high efficiency in use of the mold and at a low cost.

In pressed glass of the above character, the adjacent reflecting surfaces or facets are in part required to be positioned at right angles, relatively one to the other, and in other parts to have their reflecting surfaces at lesser angles to each other, such for example as 70°; and it is most important that these angular positions be assured at all times, both in the initial making of the mold and in the renewals and polishing of said surfaces made necessary from time to time due to the overheating of the metal and dulling of the polish.

In the making of my improved mold, I have provided the head with a plurality of pressing blocks so relatively shaped that they inter-engage and cooperate in retaining proper relative positions, and in which, furthermore, the pressing surfaces of said blocks may all be formed upon a milling machine by use of properly shaped milling cutters mounted upon the mandrel; said cutters shaping a single ridge form of less than 90° upon a portion of the blocks, and cutting a second portion of blocks with an overhanging ridge whose molding surfaces are at an angle to each other greater than 90° and each surface formed with parallel grooves, the adjacent walls of said grooves being at right angles (90°) to each other, said two characters of blocks being arranged alternately in parallel relation upon the head or plunger body of the mold.

It will be understood that the said special mold tool for pressing the facets or reflecting surfaces of the finished article, cooperate with a second or recessed mold member for completing the glass plate form of the article and preferably providing it with an apron or flanged perimeter whereby the reflecting or prismatic surfaces are protected against injury in handling or attaching the plates upon a supporting frame or back structure.

With the above and other objects in view, the nature of which will be more fully understood from the description hereinafter, the invention consists in the novel construction of glass mold, as hereinafter more fully described and defined in the claims.

Referring to the drawing: Fig. 1 is an inverted side view of a mold die embodying my invention, with a portion in section; Fig. 2 is another side view of my molding means; Fig. 3 is a face view of the same; Fig. 4 is an enlarged view of my mold with the pressing die blocks in elevation and the body mold and glass in section; Fig. 5 is a vertical section through a completed glass reflector taken on line 2—2 of Fig. 4; Figs. 6 and 7 are perspective views of portions of the two forms of pressing dies as shaped upon the milling machine; and Fig. 8 is a vertical section showing a modification of my invention.

Figs. 3, 4 and 5 show the general configuration and prismatic construction of the reflector glass to be molded or pressed by my improved molds. It will be observed that the general shape of the molded article is rectangular or square as to its body 6 and that its outer face is a plane surface as at 2 bounded by a backwardly extending apron 15 to form a recessed portion 3 embodying prismatic forms constituting triple reflectors having capacity for reflecting back a beam of light toward the source of said beam. In the ordinary use of glass of this character as a danger signal, the beam of light from the headlights of an automobile approaching the reflector, illuminates it with all the brilliancy of a directly reflected beam from its source and causes the light so projected upon it to be reflected back to the driver of the automobile providing the light beam, indicating danger and requirement of caution.

In general the prismatic surface is made up of a plurality of triple reflector units arranged parallel to each other and comprising the facets or surfaces 4 and 5 and the units reversed as shown, so that two of the surfaces 4 meet to form a groove of less than a right angle and two of the sets of the grooved or corrugated surfaces 5 meet to form a groove greater than a right angle (see Fig. 4); and in which further the angle formed between the surfaces 4 and 5 is a right angle. This particular construction of the glass forms no part of my invention, but should be understood to enable a better comprehension of my improvements in the molding means for the making of such reflectors.

The mold blocks 15 and 16 have their pressing ends 14 so formed that they, as a whole, simultaneously press the reflecting surfaces of the plurality of units. The rear problem was to provide a glass mold for pressing the glass of the character here shown with the least number of pressing members of blocks 15 and 16 and to so shape them that all of their angles and surfaces may be accurately shaped upon a simple form of milling machine and with the omission of uncertain hand work. Furthermore, by such special construction in the initial making of the pressing members of the mold, the said members in the form of blocks may be dismantled and reground or finished with a high polish whenever the pressing surfaces are dulled by heat due to extensive use of the mold. This is very important, since for pressing perfect reflecting surfaces upon the glass, the metal mold surfaces must be maintained in a similar state of finish, and the shaping of the pressing members must lend itself to such refinishing of the pressing surfaces both as to accuracy and cheapness in cost of such work.

Another advantage of my improvements, arises from the fact that these special blocks 15 and 16 may be made in quantities, for enabling quick replacing of the pressing elements in the mold head whenever required.

When the beam of light falls upon the flat front face 2 of the reflector, making a right angle thereto as at the arrow A in Fig. 4, the reflection is 100% efficiency, but when said beam of light falls upon said face at an angle thereto, as per the arrows B and C in Fig. 4, the reflection of the light is less efficient.

When considering one reflecting unit alone, it is less efficient when approaching from an angle to one side of the perpendicular than from the other side, and because of this, the adjacent units are reversed so that every other unit will reflect strongly when the beam of light approaches the reflector at an angle from one side, and similarly, the remaining units will reflect strongly when the beam of light approaches at an angle from the other side. By reason of this, an automobile approaching the signal from either side angle will receive back an equally strong reflected beam from one or the other of the reflector units. The molding means must so mold the units that they may operate efficiently in either case.

I will now describe more minutely the construction embodied in my improved mold as made and used. 9 is a plunger of any suitable construction having a flange 10 at one end. A plate 11 rests upon said flange and upon the surface of this plate 11 are abutted the pressing blocks 15 and 16, arranged alternately and secured to the plate by countersunk screws 17. These blocks 15 and 16 are in the form of approximately the same thickness and width, the latter, in the example shown, being in width about nine times the thickness, but this would be changed somewhat according to the area of the pressed glass plates to be formed. These blocks 15 and 16 are preferably bolted together by horizontal screws or bolts 18. Surrounding the blocks 15 and 16 is a collar plate 12, which by screws or bolts 13 is attached to the flange 10 of the plunger 9 and furthermore clamps the plate 11 tightly in position. In this manner the whole head is built up as a strong and durable means for bringing the pressing dies into molding operation, and at the same time permitting the parts to be dismantled for replacement of the blocks 15 and 16 by new blocks or to permit the members 15 and 16 to be removed for repolishing.

The blocks 15 are substantially rectangular with a ridge 19 as a pressing face and preferably the surfaces of the ridge 19 make an angle with each other of approximately 70° as indicated in Figs. 4 and 6. These ridge-shaped pressing ends 19 press the grooves 4 in the glass (Fig. 4).

The blocks 16 also provide a general ridge-like pressing construction at 20 whose oblique surfaces are each formed of two grooved portions 5a arranged at an angle of approximately 110° as shown in Figs. 4 and 7. These grooved portions 5a have their adjacent walls forming right or 90° angles as indicated by the molded glass (Fig. 5). It is further pointed out that these ridge-like pressing structures 20 of the blocks 16 overhang at their sides as shown at 16a in Fig. 7 and the angles of these parts are such as will cause them to fit tightly upon the ridge surfaces 19 of the blocks 15, as clearly shown in Figs. 1, 4 and 8. Moreover, these overhanging surfaces 16a are at right angles to the molding surfaces 5a of the grooves. This is most important as the coaction of the surfaces 19, 5a and 16a must provide molded cube-like corners or prisms as at 24 in Fig. 3. It will further be seen that the surfaces 5a are trapezoidal as is shown in Figs. 3, 4, 7 and 8.

I have described the special molding dies for shaping the prismatic portions of the reflector but it is to be understood that this molding of the glass takes place in a dish-like base 21 having a recess 22 which provides the shaping of the flat face 2 of the pressed glass and also the formation of the apron portion 15c. A ring or collar 23 is employed upon the base member 21 to properly shape the apron at its free edge. In the molding of the apron 15c, the outer die blocks 15 are cut away on their outer sides, as at 15a, to mold the steep inner wall of the said apron. In these outer blocks 15 the ends 19 mold grooves but only one of its faces are required to mold surfaces 4 in the glass as the outer units terminate in the groove next to the apron.

Referring now to the modification shown in Fig. 8, there is very little difference from what has already been described. These consist of the following features. Instead of the blocks 15 being secured in position upon the plate 11 by screws, I cast them integral with the plate as shown at 11c and 15c, while the overhanging ridge-like blocks 16c and 20c are detachably held in place by the screws 17 as before. The collar frame 12 of Fig. 1 has been omitted and the flange 10 of the plunger directly fastened to the plate 11c by screws 13c. The ridge portions of blocks 15c in this modification are shown at 19c.

It will now be apparent that I have devised a novel and useful construction which embodies the features of advantages enumerated as desirable, and while I have in the present instance shown and described the preferred embodiment thereof which has been found in practice to give satisfactory and reliable results, it is to be understood that I do not restrict myself to the details stated as the same are susceptible of modification in various particulars, without departing from the spirit or scope of the invention.

I claim:

1. Means for molding a reflector formed of a pressed glass plate having its rear face provided with a prismatic construction comprising a plurality of parallel grooved portions, each of whose surfaces are at an angle to each other less than a right angle, and interposed transversely grooved portions extending obliquely in opposite directions at right angles from the faces of two adjacent parallel grooves and forming an angle to each other greater than a right angle, and said transverse grooved portions each formed of oblique surfaces arranged in pairs at right angles to each other, said means comprising two sets of elongated molding blocks arranged alternately side by side, each of the blocks of one set having its molding ends forming a simple ridge with oppositely inclined faces and the blocks of the other set each formed with overhanging ridge portions having inclined end surfaces extending over and making overlapping contact with the inclined surfaces of adjacent blocks of the other set, and means for causing the last-mentioned sets of blocks to be drawn backwardly upon the ridge portions of the first-mentioned set of blocks to form tight joints between the respective blocks of the two sets of blocks where they contact at the overlapping surfaces.

2. The invention according to claim 1, wherein further, the grooved surfaces forming the overhanging ridge-like form of one set of the blocks are arranged to provide between their under clamping surfaces an angle less than a right angle.

3. The invention according to claim 1, wherein further, the abutting surfaces of each block of both sets are arranged at an angle to each other less than a right angle.

4. The invention according to claim 1, wherein further, the plurality of transversely grooved portions of one set of blocks terminate in the overhanging portions and abut against the surfaces of the molding parts of the other set.

5. The invention according to claim 1, further provided with means at the end of the block most distant from the ridge-like structure for applying tension upon the block in a direction transversely to its length.

6. The invention according to claim 1, wherein further, the overhanging blocks of one set overlap the surface of the blocks of the other set and are provided with clamping means whereby said overlapping relation is assured.

7. A mold for glass molding, comprising a block having a molding end formed of a ridge-like structure whose faces overhang and are arranged at an angle to each other greater than a right angle and said faces formed of parallel grooves whose adjacent surfaces are at right angles to each other and whose end portions each lie in a plane at right angles to the length of the grooves, combined with two parallel bounding blocks having inclined surfaces over which the ridge-like structure extends and presses, and means for clamping the ridge-like block structure upon the inclined surfaces of the bounding blocks.

RUDOLPH M. HUNTER.